April 8, 1941.  E. D. HOWE  2,237,991

FISHING REEL

Filed Oct. 31, 1939

Emery D. Howe
INVENTOR

BY Victor J. Evans & Co.
ATTORNEYS

Patented Apr. 8, 1941

2,237,991

UNITED STATES PATENT OFFICE 2,237,991

FISHING REEL

Emery D. Howe, Coldwater, Mich.

Application October 31, 1939, Serial No. 302,218

1 Claim. (Cl. 242—84.5)

My invention relates to fishing reels and has as one of the principal objects thereof the provision of a fishing reel equipped with means for effecting braking of the spool to preclude backlash during a casting operation.

Another object of my invention is to provide a device of the above described character which is simple in construction, durable in use, efficient in operation and economical in manufacture.

A special object of my invention is to provide means for imparting a braking action to the spool of a reel and which is so constructed and arranged whereby the same may be readily applied to reels already in use without substantially modifying the latter.

Other objects and advantages will be apparent from the following description, appended claim and annexed drawing.

Referring to the drawing wherein like reference characters designate like parts throughout the several views.

Figure 1:
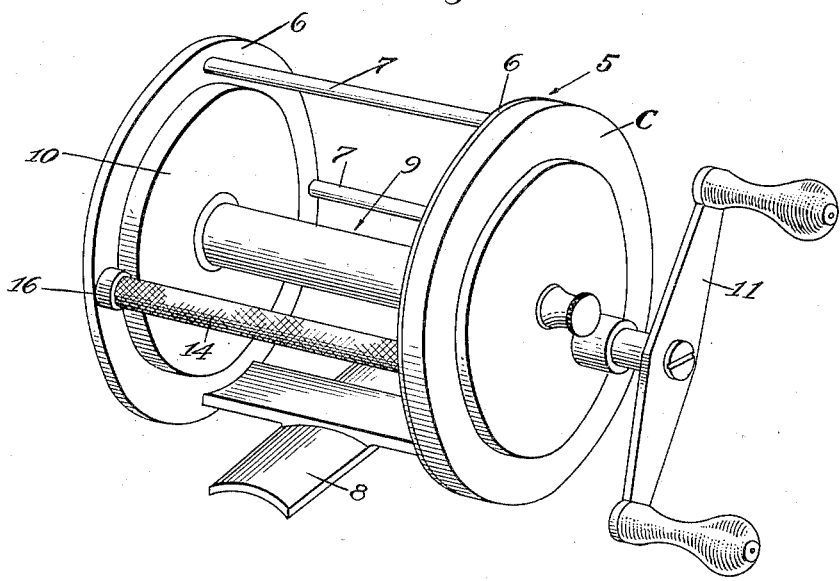
Figure 1 is a perspective view of a fishing reel equipped with my invention.
Figure 2:
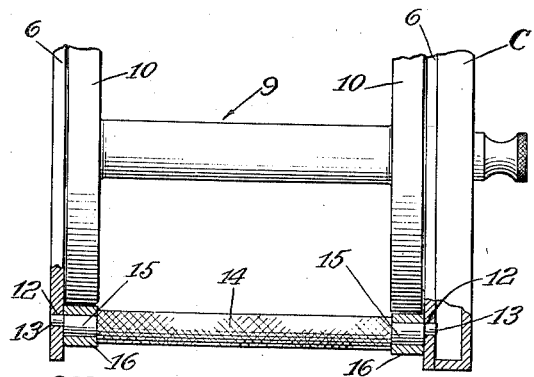
Figure 2 is a front elevation, partly in section.
Figure 3:
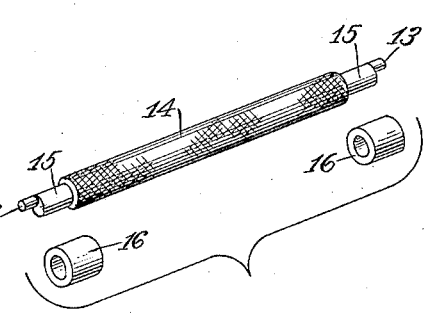
Figure 3 is a disassembled perspective view of the rod and rollers.

In practicing my invention, as illustrated in Figures 1 to 3 inclusive of the drawing, I provide a reel 5 comprising a pair of heads 6 secured together in spaced relation by means of pillars 7 and a curved plate 8, the latter serving to secure the reel to a fishing rod (not shown). Rotatably mounted between the heads 6 is a spool 9 having spaced end flanges 10 arranged adjacent the inner faces of the heads. One of the heads has secured thereto a casing C which encloses operating mechanism (not shown) for operating the spool through the medium of the crank or handle 11. Inasmuch as the foregoing described reel is of an ordinary construction and forms no part of the present invention per se a more detailed description and illustration of the same is not believed warranted.

Adjacent the periphery of the flanges 10, the heads are formed with opposed aligned openings 12 in which are rotatably mounted trunnions 13 eccentrically formed on the ends of a rod 14. Adjacent the trunnions, the end sections of said rod are of a reduced diameter as at 15 and on which are rotatably mounted ferrule wheels or rollers 16 for engagement with the peripheries of the flanges 10. The rod normally occupies a position wherein the rollers 16 are out of contact with the peripheries of the flanges 10 and in operation, to prevent backlash, the rod is rocked or rotated on the trunnions 13 towards the spool by the thumb whereby the rollers 16 are carried into engagement with the peripheries of the flanges 10 thus imparting a braking action to the spool.

The amount of braking action imparted to the spool is dependent upon the amount of pressure applied to the rod by the thumb. As illustrated in the drawing, the rod, between the end sections, is roughened to preclude slipping of the thumb during operation.

Figure 4:
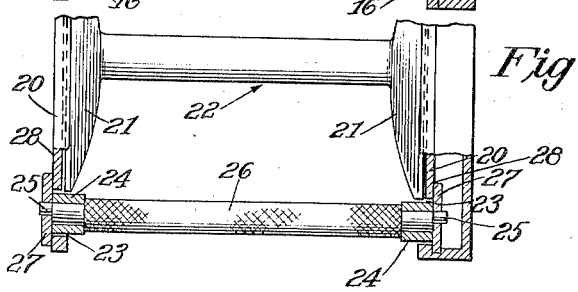
Figure 4 is a front elevation partly in section of a modified form of my invention.

In the modified form illustrated in Figure 4 of the drawing, the heads 20, adjacent the flanges 21 of the spool 22, are provided with openings 23 for receiving therein the outer ends of the rollers 24 and the trunnions 25 of the rod 26 are journaled in bearings 27 fixed to the outer faces 28 of the heads 20, it being understood that the openings are of a sufficient diameter with respect to the rollers to permit rocking of the rod to effect engagement of the rollers with the flanges.

It is obvious that the invention is not confined to the herein described use therefor as it may be utilized for any purpose to which it is adaptable. It is therefore to be understood that the invention is not limited to the specific construction as illustrated and described, as the same is only illustrative of the principles of operation, which are capable of extended application in advance forms, and that the invention comprehends all construction within the scope of the appended claim.

What I claim is:

In combination with a reel having spaced heads and a spool rotatably mounted between said heads, a rod fashioned with eccentrically arranged trunnions on the ends thereof with said trunnions rotatably mounted in said heads adjacent said spool, rollers carried by said rod adjacent said trunnions and operable by said rod towards said spool for engagement with the latter to impart a braking action thereto.

EMERY D. HOWE.